US 8,444,226 B2

(12) United States Patent
Driessen et al.

(10) Patent No.: US 8,444,226 B2
(45) Date of Patent: May 21, 2013

(54) LEG-RESTS FOR PASSENGER SEATS

(75) Inventors: Peter Driessen, Denton, TX (US); Rik Westerink, Corinth, TX (US)

(73) Assignee: Zodiac Seats US LLC, Gainesville, TX (US)

(*) Notice: Subject to any disclaimer, the term of this patent is extended or adjusted under 35 U.S.C. 154(b) by 374 days.

(21) Appl. No.: 12/750,019

(22) Filed: Mar. 30, 2010

(65) Prior Publication Data

US 2010/0244534 A1 Sep. 30, 2010

Related U.S. Application Data

(60) Provisional application No. 61/164,538, filed on Mar. 30, 2009.

(51) Int. Cl.
*A47C 20/04* (2006.01)
*A47C 7/50* (2006.01)

(52) U.S. Cl.
USPC .................................. 297/423.28; 297/426.3

(58) Field of Classification Search
USPC ................. 297/423.26, 423.28, 423.3, 463.1, 297/463.2
See application file for complete search history.

(56) References Cited

U.S. PATENT DOCUMENTS

| | | | | |
|---|---|---|---|---|
| 2,563,629 A * | 8/1951 | Watter | | 297/423.36 |
| 4,509,795 A * | 4/1985 | Brennan et al. | | 297/423.32 |
| 4,819,987 A | 4/1989 | Stringer | | |
| 5,352,020 A | 10/1994 | Wade et al. | | |
| 5,447,359 A * | 9/1995 | Asbjornsen et al. | | 297/423.35 |
| 5,918,942 A * | 7/1999 | Olsen | | 297/423.32 |
| 6,517,160 B2 * | 2/2003 | Marcantoni | | 297/423.36 |
| 6,652,033 B2 | 11/2003 | Satoh | | |
| 6,663,184 B2 | 12/2003 | Hagiike | | |
| 6,764,137 B2 | 7/2004 | Menard | | |
| 6,773,074 B2 | 8/2004 | Flory et al. | | |
| 6,916,069 B2 | 7/2005 | Bauer et al. | | |
| 6,929,320 B2 * | 8/2005 | Laurent | | 297/83 |
| 7,121,627 B2 | 10/2006 | Gaikwad et al. | | |
| 7,201,451 B2 | 4/2007 | Baumann | | |
| 7,918,496 B2 * | 4/2011 | Mackert | | 297/75 |
| 2001/0033101 A1 | 10/2001 | Plant | | |
| 2006/0158015 A1 | 7/2006 | Tsuji et al. | | |

FOREIGN PATENT DOCUMENTS

| | | |
|---|---|---|
| DE | 8708102 | 8/1987 |
| DE | 29700217 | 4/1997 |
| WO | WO02051703 | 7/2002 |

OTHER PUBLICATIONS

International Search Report and Written Opinion dated Jun. 30, 2010 in related Application No. PCT/US2010/029143.

* cited by examiner

*Primary Examiner* — Milton Nelson, Jr.
(74) *Attorney, Agent, or Firm* — Dean W. Russell; Tiffany L. Williams; Kilpatrick Townsend & Stockten LLP (57) ABSTRACT

Embodiments of the present invention include a leg-rest assembly comprising a leg-rest pan, a first frame, a slider bar, a second frame, and at least one deployment link. In some embodiments, the first frame includes at least two slides that are coupled to the slider bar. In other embodiments, the leg-rest assembly includes at least two seat diaphragm mounts, wherein the at least two seat diaphragm mounts are coupled the leg-rest assembly to a seat diaphragm. In some embodiments, a cushion is coupled to the leg-rest pan exterior surface. In yet other embodiments, the leg-rest assembly includes a foot-rest pan and a single frame with at least two foot-rest slides, where the foot-rest pan is coupled to the foot-rest slides. In these embodiments, the leg-rest assembly may also include a foot-rest bar.

13 Claims, 14 Drawing Sheets

LEG-RESTS FOR PASSENGER SEATS

CROSS REFERENCE TO RELATED APPLICATIONS

This application is related to and claims priority benefits from U.S. Provisional Application Ser. No. 61/164,538, filed on Mar. 30, 2009, entitled MECHANICAL LEGREST DEPLOYMENT. The '538 application is hereby incorporated in its entirety by this reference.

FIELD OF THE INVENTION

The field of the invention relates to leg-rests or foot-rests for passenger seats or the like.

BACKGROUND

Many vehicle seats such as those on passenger aircraft, buses, trains and the like have installed thereon an extendable foot-rest or leg-rest for the reclining comfort of the passenger. Typically, these extendable foot-rests or leg-rests are located in a stowed position below the seat cushion bull nose.

In certain situations, however, it is desirable to reduce the length of the cushion bull nose. For example, by reducing the overall length of the seat cushion, the amount of space between rows of seats may be reduced, thus increasing the number of seats that may be included within the same area. In these circumstances, the amount of space below the cushion bull nose is not sufficient to adequately stow foot-rests or leg-rests. As a result, these seats do not include leg-rests or foot-rests, which significantly reduces the level of comfort experienced by passengers in these seats.

Because many people must sit, and sometimes even sleep, for long hours in passenger seats, there is a need for a leg-rest or foot-rest design that can be adequately stowed below more compact seat designs.

SUMMARY

Embodiments of the present invention include a leg-rest assembly comprising a leg-rest pan, a first frame, a slider bar, a second frame, and at least one deployment link. An interior surface of the leg-rest pan is coupled to the first frame. In some embodiments, the first frame includes at least two slides that are coupled to the slider bar. The at least one deployment link is pivotally coupled at one end to an upper pivot bar and pivotally coupled at an opposing end to a vertical support. In some embodiments, at least one link extension couples the upper pivot bar to the slider bar.

Some embodiments include a coupling structure with a coupling pivot bar and at least two pivot arms, wherein each pivot arm is pivotally coupled at one end to the coupling pivot bar and coupled at an opposing end to the second frame. In other embodiments, the leg-rest assembly includes at least two seat diaphragm mounts, wherein the at least two seat diaphragm mounts are coupled at one end to the coupling pivot bar and coupled at an opposing end to a seat diaphragm. In some embodiments, a cushion is coupled to the leg-rest pan exterior surface.

In yet other embodiments, the leg-rest assembly includes a foot-rest pan and a frame with at least two foot-rest slides. The foot-rest pan is coupled to the foot-rest slides. In these embodiments, the leg-rest assembly may also include a foot-rest bar. Some embodiments include a recessed area within the cushion that is configured to receive the foot-rest bar.

DETAILED DESCRIPTION

Embodiments of the invention provide leg-rest assemblies for use with a vehicle seat. While the leg-rest assemblies are discussed for use with aircraft seats, they are by no means so limited. Rather, embodiments of the leg-rest assemblies may be used in vehicle seats or other seats of any type or otherwise as desired.

FIGS. 1-11 illustrate one embodiment of a leg-rest assembly 10. The leg-rest assembly 10 comprises a cushion 12, a leg-rest pan 14, a frame structure 16, and a mounting structure 18.

Figure 1:
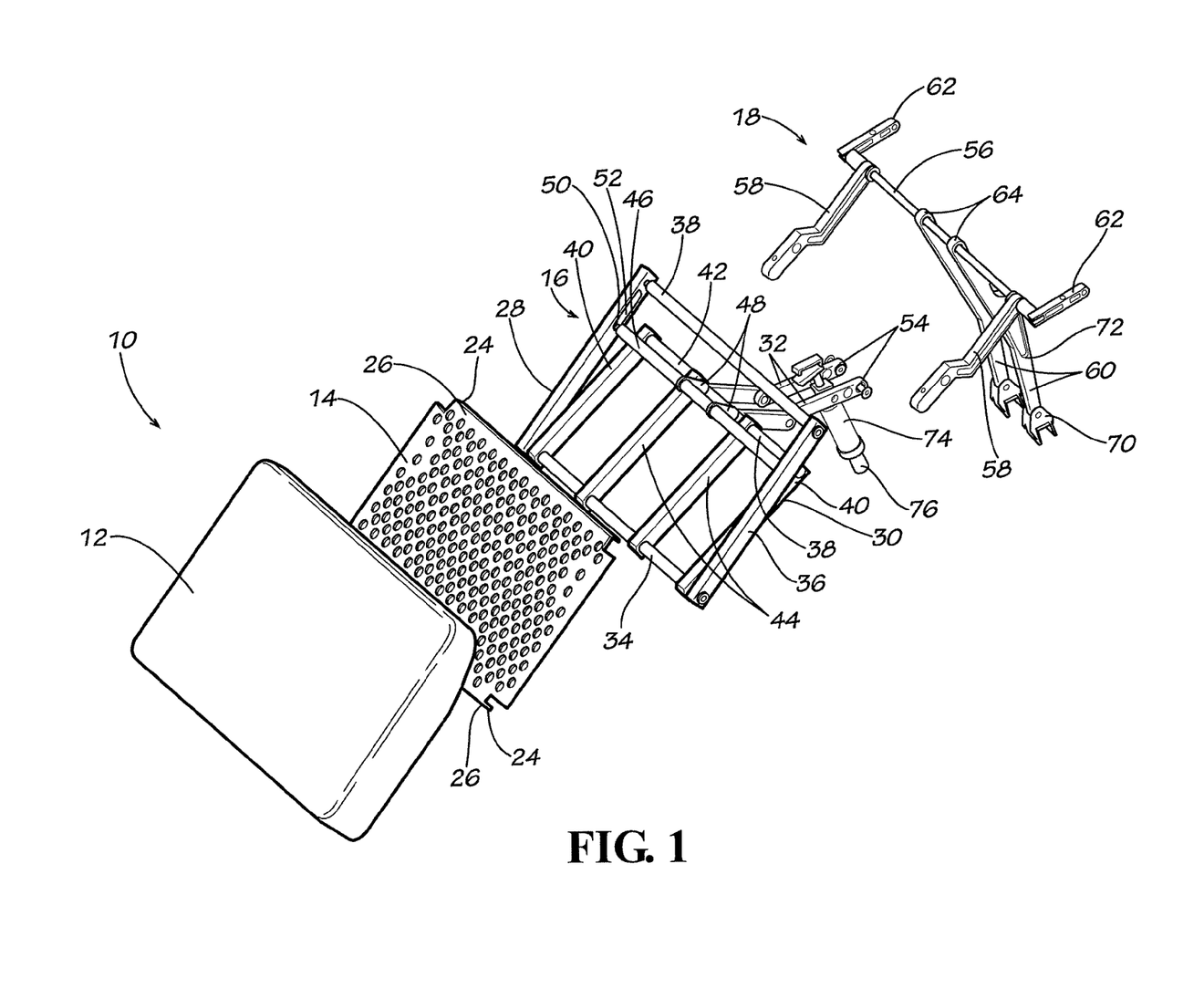
FIG. 1 is an exploded perspective view of a leg-rest assembly according to one embodiment of the present invention.
Figure 2:
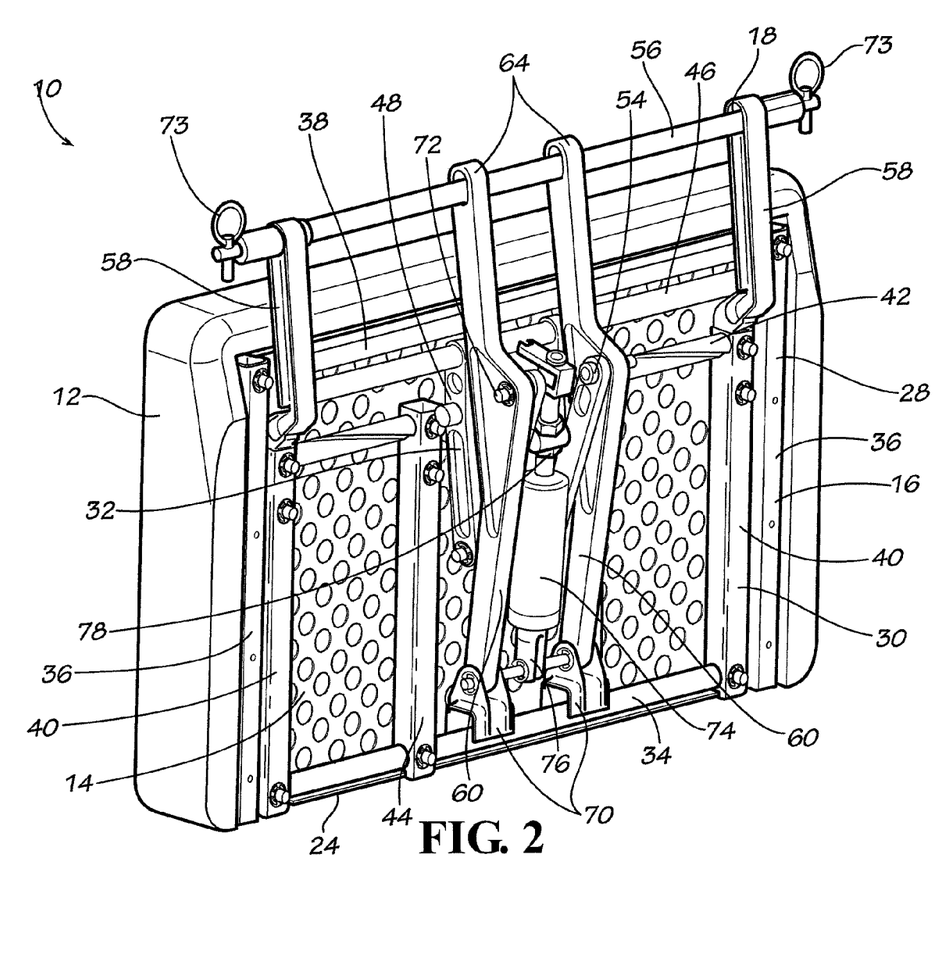
FIG. 2 is a rear perspective view of the leg-rest assembly of FIG. 1 in a stowed position.
Figure 3:
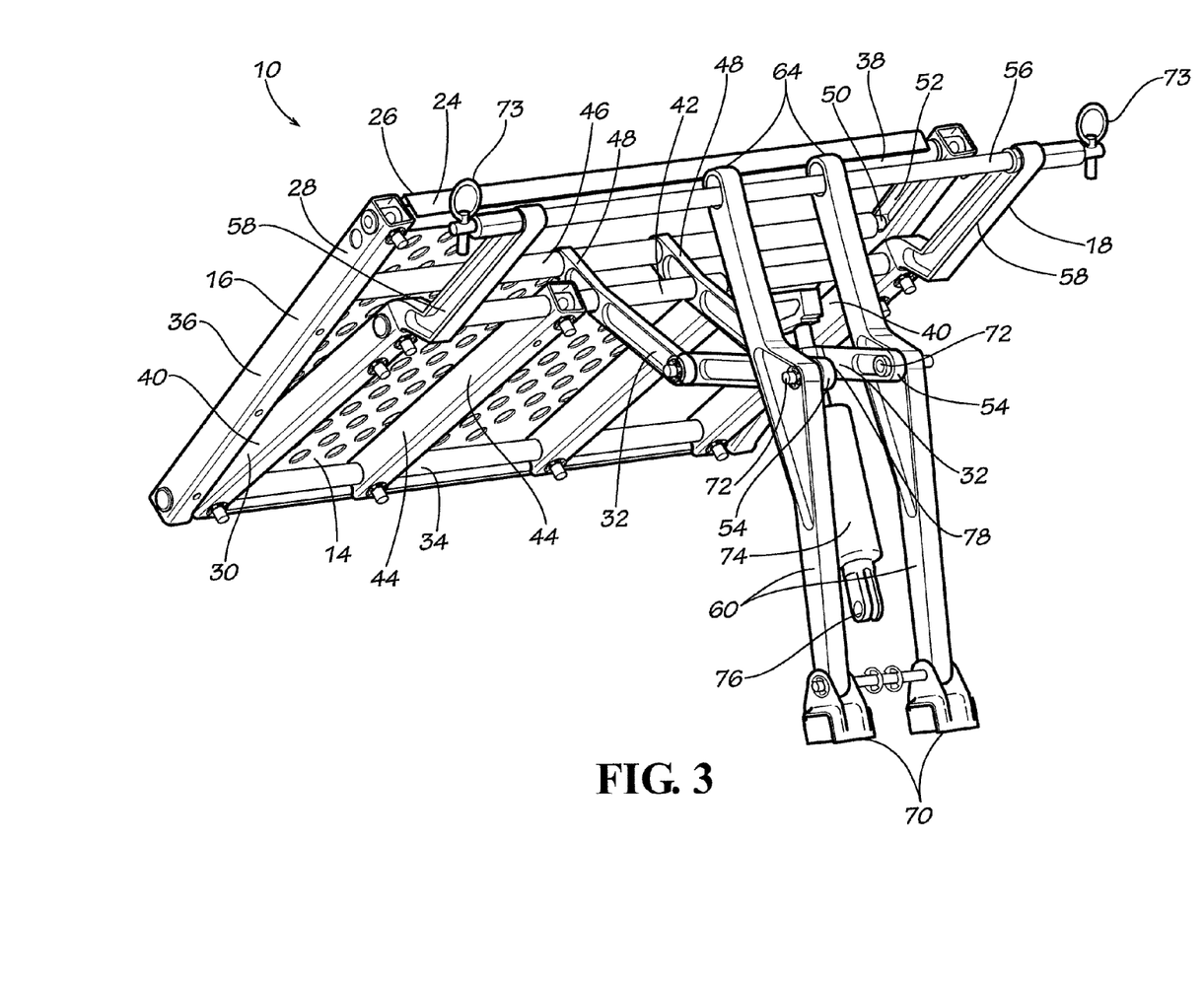
FIG. 3 is a rear perspective view of the leg-rest assembly of FIG. 1 in a deployed position.

As shown in FIG. 2, the cushion 12 is located adjacent the leg-rest pan 14. The cushion 12 may have any suitable shape that provides sufficient surface area to support a passenger's legs, while properly stowing below a vehicle seat 20. For example, the cushion 12 may have a rectilinear or other similar shape. The covering of the cushion 12 may be formed of any suitable material including but not limited to textiles, woven or nonwoven fabrics, leather, synthetic materials, plastics, or other similar materials. The thickness of the cushion 12 may be determined by the total amount of space available below a passenger seat bull nose 22 to stow the leg-rest assembly 10. The thickness of the cushion 12 typically may range from 0.5 inches to 4 inches. In some embodiments, the thickness of the cushion 12 may be approximately 2 inches. The internal composition of the cushion 12 may include any suitable material that provides a comfortable resting location for a passenger's legs, while providing a durable material that will withstand repeated usage. The type of internal cushion material includes but is not limited to viscoelastic materials, foam materials, honeycomb-shaped materials, cushioning materials, or other similar materials. The cushion 12 is coupled to the leg-rest pan 14 by any suitable means. For example, the cushion 12 may be coupled to the leg-rest pan 14 by a releasable fastening means that may allow the cushion 12 to be replaced without the need to remove the leg-rest assembly 10. Alternatively, it may be desirable to permanently couple the cushion 12 to the leg-rest pan 14 via glue or other similar attachment means that may improve the useful life of the cushion 12.

The leg-rest pan 14 has a shape that generally conforms to the shape of the cushion 12. The leg-rest pan 14 is formed of aluminum, stainless steel, other metallic materials, composite materials, or other similar materials that provides sufficient strength to withstand the load exerted by a passenger's legs. In some embodiments, the leg-rest pan 14 may include a design having multiple apertures throughout the surface to reduce the amount of weight created by the leg-rest pan 14. The leg-rest pan 14 may also include at least two flanges 24 that are coupled to the upper and lower edges 26 of the leg-rest pan 14.

FIGS. 1-6 illustrate one embodiment of the frame structure 16. In this embodiment, the frame structure 16 includes a first frame 28, a second frame 30, and at least one deployment link 32. The first frame 28 has a shape that generally complements the shape of the leg-rest pan 14. The first frame 28 is formed by a lower pivot bar 34, side bars 36, and an upper bar 38. The flanges 24 of the leg-rest pan 14 fit over the upper bar 38 and the lower pivot bar 34. The leg-rest pan 14 is then coupled to the first frame 28 via mechanical fastening devices such as rivets, screws, or other similar devices. The first frame 28 is constructed of any suitable material including but not limited to aluminum, stainless steel, other metallic materials, composite materials, or other similar materials that provides sufficient strength to withstand the load exerted by a passenger's legs.

The lower pivot bar 34 is pivotally coupled to the second frame 30. The second frame 30 is shaped to fold within the confines of the first frame 28 when the leg-rest assembly 10 is stowed. The second frame 30 is likewise constructed of any suitable material including but not limited to aluminum, stainless steel, other metallic materials, composite materials, or other similar materials. The second frame 30 is formed by the lower pivot bar 34, two side bars 40, and an upper pivot bar 42. The second frame 30 may also include support bars 44 that provide additional structural integrity to the second frame 30. The upper pivot bar 42 is coupled to a slider bar 46 via link extensions 48. The slider bar 46 is in turn coupled at each of its ends 50 to slides 52 that are positioned adjacent each side bar 36.

The upper pivot bar 42 is coupled to the deployment link 32. The deployment link 32 is constructed of any suitable material including but not limited to aluminum, stainless steel, other metallic materials, composite materials, or other similar materials. The deployment link 32 is in turn coupled at its opposing end 54 to the mounting structure 18.

As shown in FIGS. 1-6, the mounting structure 18 includes a pivot bar 56, at least two pivot arms 58, at least one vertical support 60, and at least two seat diaphragm mounts 62. Each pivot arm 58 is coupled at one end to the pivot bar 56 and at its opposing end to the second frame 30.

Figure 4:
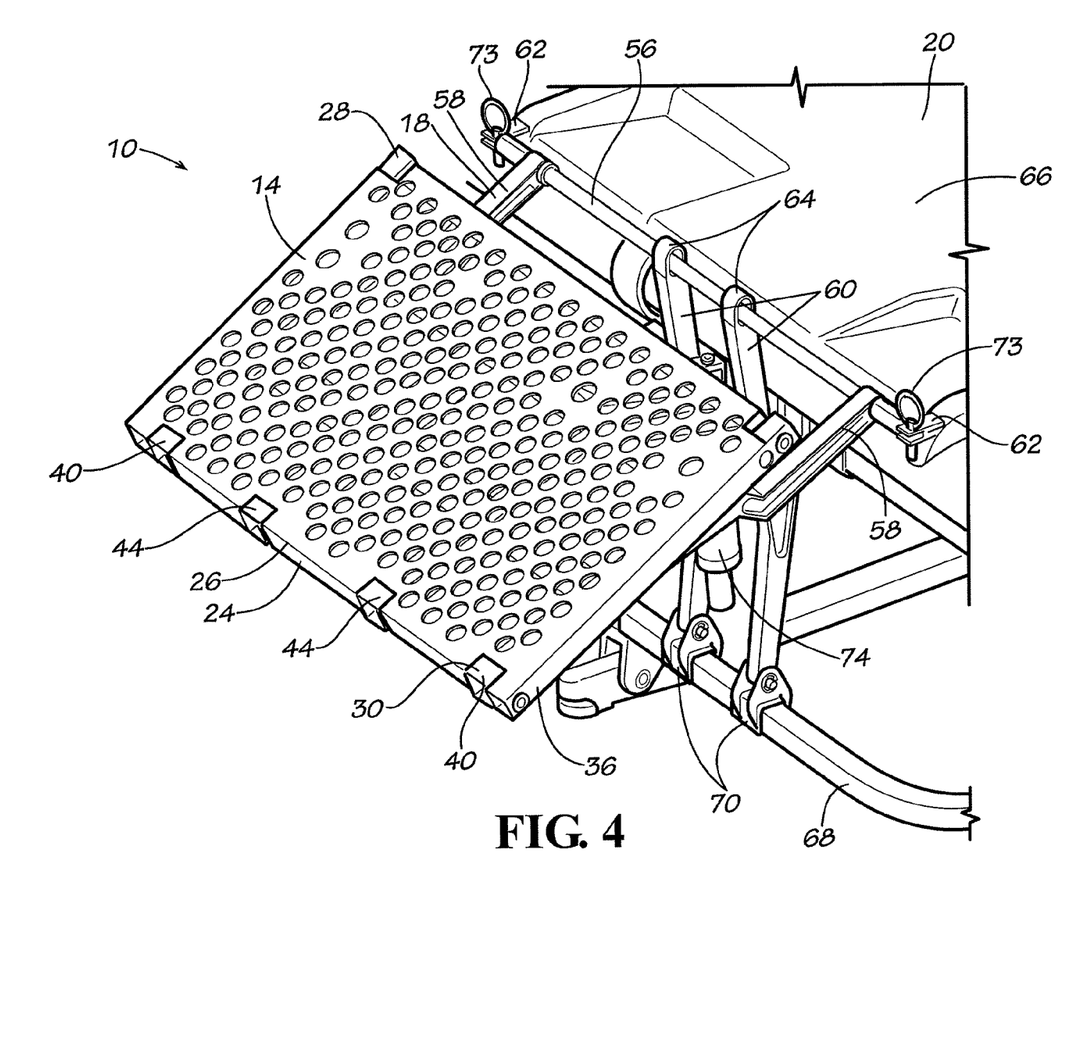
FIG. 4 is a front perspective view of the leg-rest assembly of FIG. 1 in a deployed position.
Figure 5:
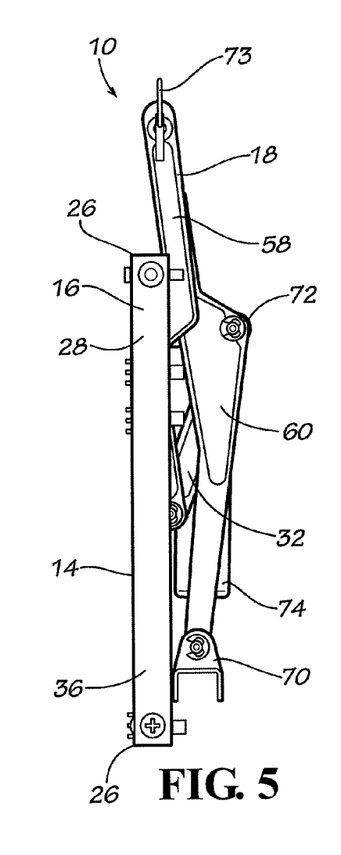
FIG. 5 is a side view of the leg-rest assembly of FIG. 1 in a stowed position.
Figure 6:
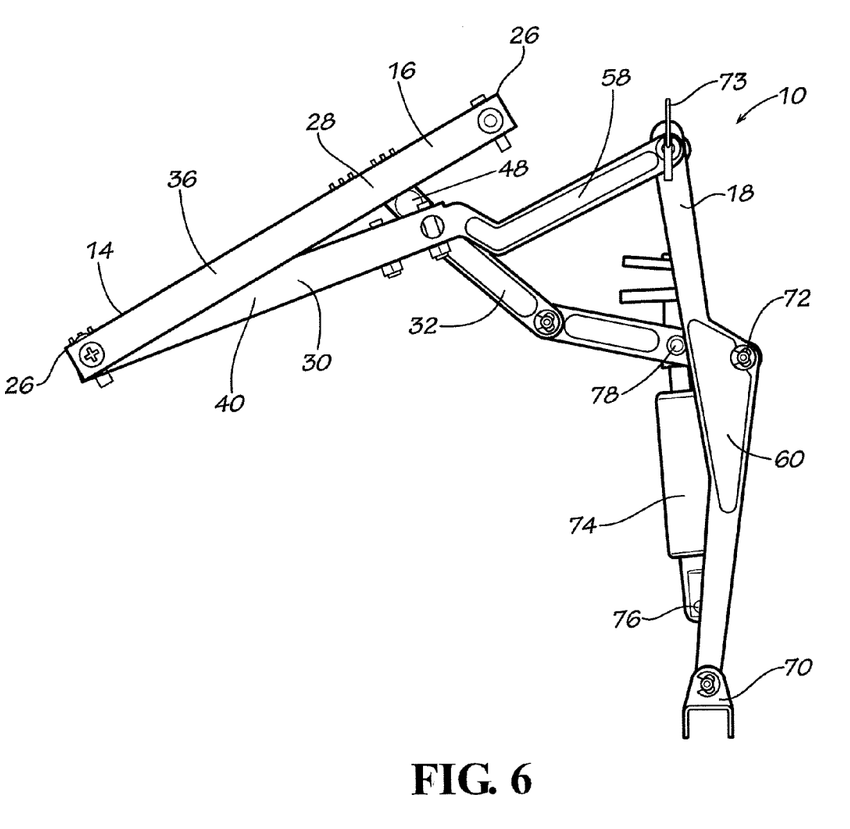
FIG. 6 is a side view of the leg-rest assembly of FIG. 1 in a deployed position.
Figure 7:
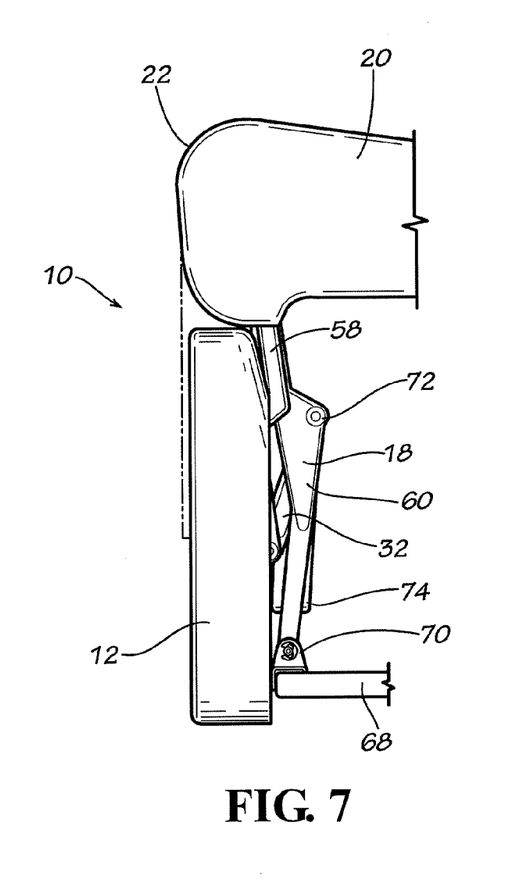
FIG. 7 is a side view of the leg-rest assembly of FIG. 1 in a stowed position in conjunction with a passenger seat.
Figure 8:
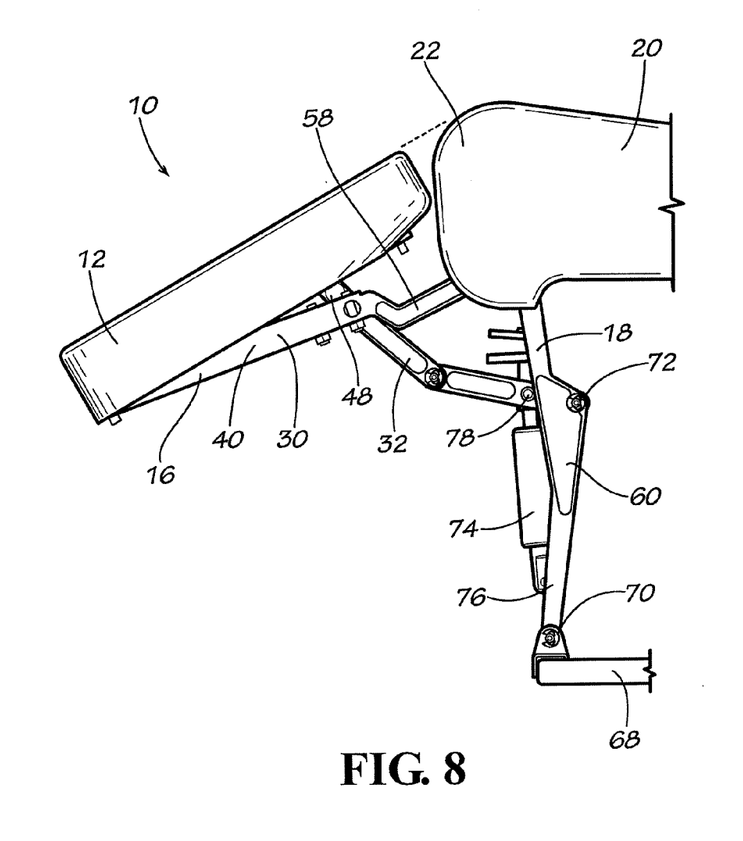
FIG. 8 is a side view of the leg-rest assembly of FIG. 1 in a deployed position in conjunction with a passenger seat.
Figure 9:
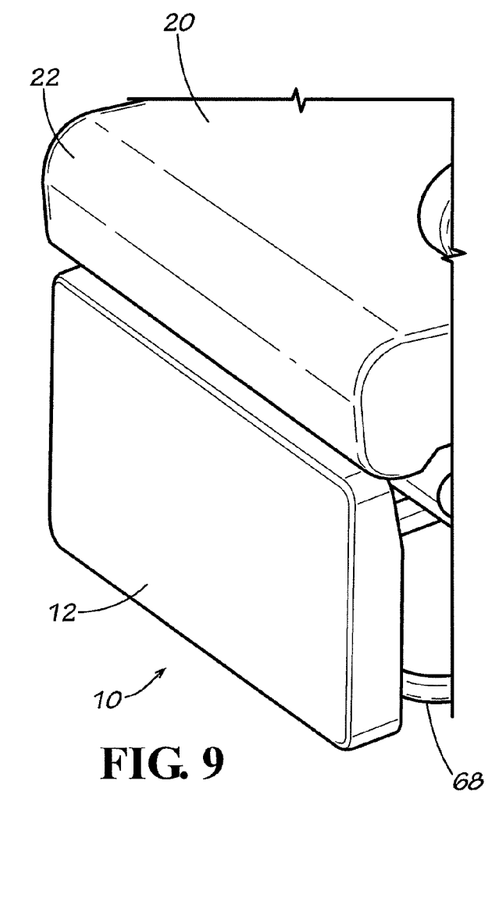
FIG. 9 is a front perspective view of the leg-rest assembly of FIG. 1 in a stowed position in conjunction with a passenger seat.
Figure 10:
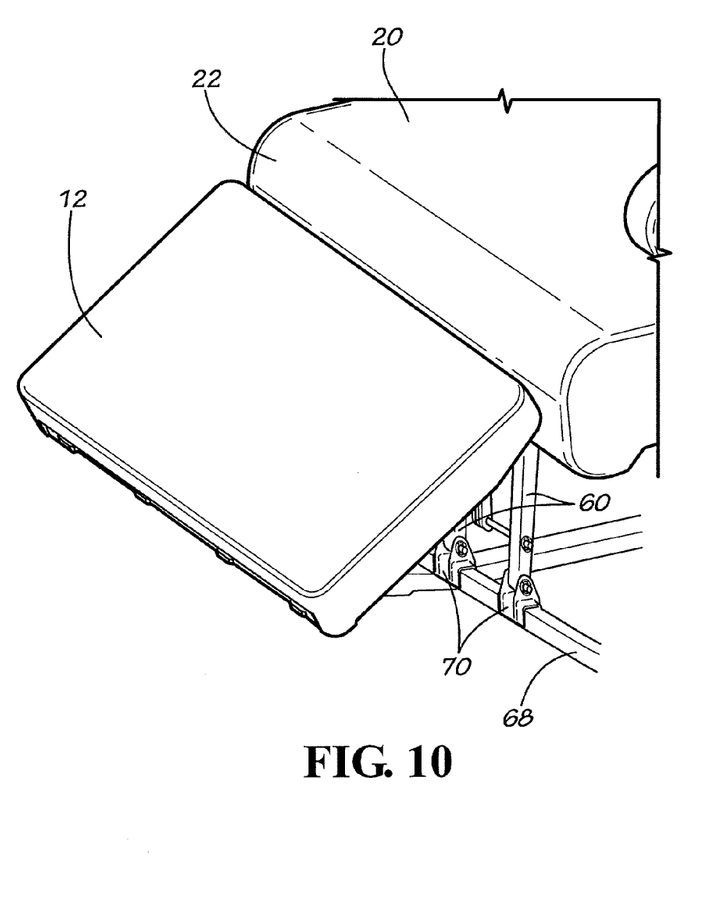
FIG. 10 is a front perspective view of the leg-rest assembly of FIG. 1 in a deployed position in conjunction with a passenger seat.

Each vertical support 60 may include a slot 64 through which the pivot bar 56 passes. The slots 64 allow a seat diaphragm 66, as illustrated in FIG. 4, to articulate during recline, while keeping the mounting structure 18 rigid. However, the vertical support 60 may be coupled to the pivot bar 56 in any suitable manner that allows the seat diaphragm 66 to articulate during recline. In some embodiments, as shown in FIGS. 7-11, each vertical support 60 may also be coupled at its lower end to a baggage bar 68 via a baggage bar mount 70. The baggage bar mount 70 provides additional coupling locations to the baggage bar 68 below the vehicle seat 20. The secondary attachment to the baggage bar 68 may provide additional load distribution between the seat diaphragm 66 and the baggage bar 68 should the load on the seat diaphragm 66 require additional support. The end 54 of the deployment link 32 is pivotally coupled to a point 72 along the length of the vertical support 60.

Finally, in some embodiments, each seat diaphragm mount 62 is coupled at one end to the pivot bar 56. The opposing end of each seat diaphragm mount 62 is then coupled to the seat diaphragm 66 of the vehicle seat 20. The seat diaphragm mounts 64 may be coupled to the seat diaphragm 66 via any appropriate fastening device 73 including but not limited to pull pins, snaps, screws, or any other device that provides for easy removal and access to the areas under the vehicle seat 20.

Figure 11:
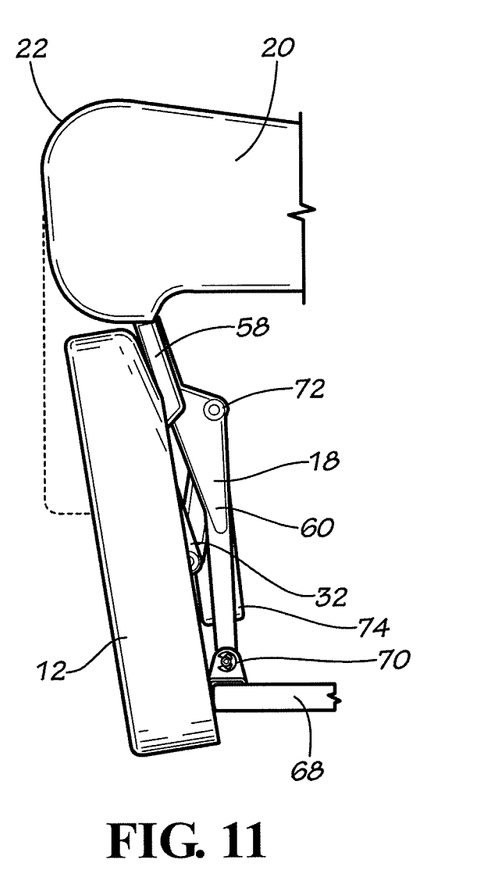
FIG. 11 is a side view of the leg-rest assembly of FIG. 1 in a stowed position in conjunction with a passenger seat in a reclined position.

By coupling the leg-rest assembly 10 to the front of the seat diaphragm 66, as illustrated in FIG. 4, the leg-rest assembly 10 moves with the seat diaphragm 66 throughout the recline motion. As a result, the cushion 12 and the passenger seat bull nose 22 maintain a desirable orientation to one another for maximum comfort when the leg-rest assembly 10 is deployed. When the seat 20 is reclined while the leg-rest assembly 10 is in a stowed position, as shown in FIG. 11, the leg-rest assembly 10 is tilted forward, but remains stowed behind a vertical line tangential to the edge of the passenger seat bull nose 22.

In some embodiments, the leg-rest assembly 10 is actuated via a gas spring 74. Deployment of the leg-rest assembly 10 is automatic when a passenger actuates the gas spring 74. A passenger actuates the gas spring 74 by pulling a lever or pushing a button that is connected to the gas spring 74 via a cable or other similar mechanical fastening device. When the lever or button is engaged, the cable releases a valve on the gas spring 74, allowing a piston to move within the gas spring 74. When the lever or button is released, the valve on the gas spring 74 closes and the piston is no longer allowed to move within the gas spring 74. Because the gas spring 74 is in a compressed position when stowed, the stored energy of the compressed gas forces the piston to move upward when the lever or button is engaged, thereby automatically deploying the leg-rest assembly 10. In other embodiments, the leg-rest assembly 10 deployment and stowage may be controlled by an electrically operated deployment, where the passenger uses a display screen or electrical switch to deploy and stow the leg-rest assembly 10.

The gas spring 74 is pivotally coupled at a lower end 76 to the vertical support 60. The gas spring 74 is then pivotally coupled at the upper end 78 to the deployment link 32. In this manner, the gas spring 74 applies force to the deployment link 32 that is coupled to the frame structure 16. The deployment link 32 then deploys the frame structure 16. The deployment link 32 also engages the link extensions 48 to cause the slider bar 46 to move to the lower ends of slides 52. The lower position of slider bar 46 causes the leg-rest pan 14 to adjust to a deployed position so that the plane of the exterior surface of the cushion 12 is tangentially aligned with the curve of the passenger seat bull nose 22. The alignment between the cushion 12 and the passenger seat bull nose 22 provides a comfortable support and transition between the passenger's thigh and calf.

To return the leg-rest assembly 10 to its stowed location, a passenger again actuates the gas spring 74 by engaging the lever or button that is connected to the valve on the gas spring 74. While releasing the valve allows the piston to move within the gas spring 74, there is no stored energy within the gas spring in a deployed orientation. Thus, the passenger must press the leg-rest assembly 10 back into its stowed position while engaging the lever or button. When the leg-rest assembly 10 has reached its stowed position, the passenger then releases the lever or button which closes the valve on the gas spring 74 and prevents the piston from moving within the gas spring 74.

Some embodiments of the present invention include an extendable foot-rest mechanism 80, as shown in FIGS. 12-20. In some embodiments, the foot-rest mechanism 80 may be located between the leg-rest pan 14 and the frame structure 16. In other embodiments, the foot-rest mechanism 80 may be located in any suitable location that allows the foot-rest mechanism to extend a sufficient distance to properly support a passenger's legs without impairing the compact stowing capabilities of the leg-rest assembly 10.

FIGS. 12-20 illustrate one embodiment of the leg-rest assembly with the foot-rest mechanism 80. The foot-rest mechanism 80 comprises a foot-rest shroud 82, a foot-rest pan 84, at least two foot-rest slides 86, a spring 88, a foot-rest bar 90, and a mechanical control lever 92. The foot-rest shroud 82 may have any suitable shape that provides sufficient surface area to support a passenger's legs, while stowing within the leg-rest assembly 10 when not in use. For example, foot-rest shroud 82 may have a rectilinear or other similar shape. In some embodiments, the foot-rest shroud 82 includes flanges 94 that are coupled to the foot-rest shroud 82 along side edges 96.

In some embodiments, the foot-rest shroud 82 may be formed of similar material used for the covering of the cushion 12, which includes but is not limited to textiles, woven or nonwoven fabrics, leather, synthetic materials, plastics, or other similar materials. The foot-rest shroud 82 may optionally include additional internal material to provide additional support between the passenger's legs/feet and the foot-rest pan 84. The type of internal cushion material includes but is not limited to viscoelastic materials, high density foam, or other similar materials. In some embodiments where the foot-rest mechanism 80 is located between the leg-rest pan 14 and the frame structure 16, the thickness of the foot-rest shroud 82 may be limited by the space between the leg-rest pan 14 and the frame structure 16. However, the foot-rest shroud 82 may be coupled to the foot-rest pan 84 in any appropriate location and by any suitable means. For example, the foot-rest shroud 82 may be coupled to the foot-rest pan 84 by a releasable fastening means that may allow the foot-rest shroud 82 to be replaced without the need to remove the leg-rest assembly 10. Alternatively, it may be desirable to permanently couple foot-rest shroud 82 to the foot-rest pan 84 via glue or other similar attachment means that may improve the useful life of the foot-rest shroud 82.

The foot-rest pan 84 has a shape that generally complements the shape of the foot-rest shroud 82. The foot-rest pan 84 may be formed of any suitable material including but not limited to aluminum, stainless steel, other metallic materials, composite materials, or other similar materials that provides sufficient strength to withstand the load exerted by a passenger's legs. In some embodiments, the foot-rest pan 84 may include a design having multiple apertures throughout the surface to reduce the amount of weight created by the foot-rest pan 84. The foot-rest pan 84 may also include flanges 98 along the side edges 100 of the foot-rest pan 84. The flanges 98 are substantially parallel to flanges 94 of the foot-rest shroud 82. However, the width of foot-rest pan 84 is dimensioned such that a space 102 is created between the flange 98 and the flange 94.

The foot-rest pan 84 is then coupled to the at least two foot-rest slides 86. Each foot-rest slide 86 include a stationary portion 104 and a sliding portion 106. The stationary portion 104 has an internal surface 108 that is configured to confront the support bar 44 of the frame structure 16. The stationary portion 104 may be coupled to the support bar 44 via any suitable mechanical fastening device including but not limited to rivets, screws, or other similar devices. The stationary portion 104 also has a stationary mating surface 110 that is configured to confront a sliding mating surface 112 of the sliding portion 106. The stationary mating surface 110 and the sliding mating surface 112 are mounted via any suitable manner that allows sliding portion 106 to travel along the length of stationary portion 104 without becoming disconnected from the stationary portion 104. For example, sliding portion 106 may include a series of male projections (not shown) that are inserted into a female receptacle track (not shown) so as to allow the sliding portion 106 to remain slidingly coupled to the stationary portion 104.

The sliding portion 106 also has an external surface 114 that is configured to contact the flanges 98 of the foot-rest pan 84. The flanges 98 may be coupled to the external surface 114 via any suitable mechanical fastening device including but not limited to rivets, screws, or other similar devices. In one embodiment, the flange 98 also includes a projection 116 extending outwardly from the flange 98 into the space 102 between the flange 98 and the flange 94. The spring 88 is positioned in the space 102 between the flange 98 of the foot-rest pan 84 and the flange 94 of the foot-rest shroud 82. The spring 88 is coupled at one end to the upper bar 38 and coupled at an opposing end to the projection 116. The flange 94 is positioned adjacent the spring 88 to conceal the spring 88 and the projection 116 from view from above or the sides when the foot-rest mechanism 80 is in use.

The foot-rest bar 90 is pivotally coupled to a location 120 on the flange 98 below the projection 116. The foot-rest bar 90 may have any appropriate shape that provides a structure to accommodate a passenger's feet while being retractable into the leg-rest assembly 10 when not in use. For example, the foot-rest bar 90 may have any shape including but not limited to rectilinear, curved, oval, or other similar shape. Moreover, the foot-rest bar 90 may have any appropriate surface design including but not limited to an aperture surrounded by a frame, a solid surface having multiple apertures throughout the surface, mesh, wire, or any other appropriate surface. The foot-rest bar 90 is constructed of any suitable material including but not limited to aluminum, stainless steel, other metallic materials, composite materials, or other similar materials. In some embodiments, the foot-rest bar 90 may be coated or covered by a protective material including but not limited to soft plastic elastomer extrusions.

In some embodiments, the existing components of the leg-rest assembly 10 may be slightly modified to accommodate the addition of the foot-rest mechanism 80. For example, in some embodiments, the cushion 12 includes a recessed area 122 that is shaped to receive and stow the foot-rest bar 90. The recessed area 122 may have any appropriate shape including but not limited to rectilinear, curved, oval, or other similar shape. While the recessed area 122 may have any appropriate depth, the maximum depth is determined by the thickness of the cushion 12, whereas the minimum depth is determined by the thickness of the foot-rest bar 90.

Figure 12:
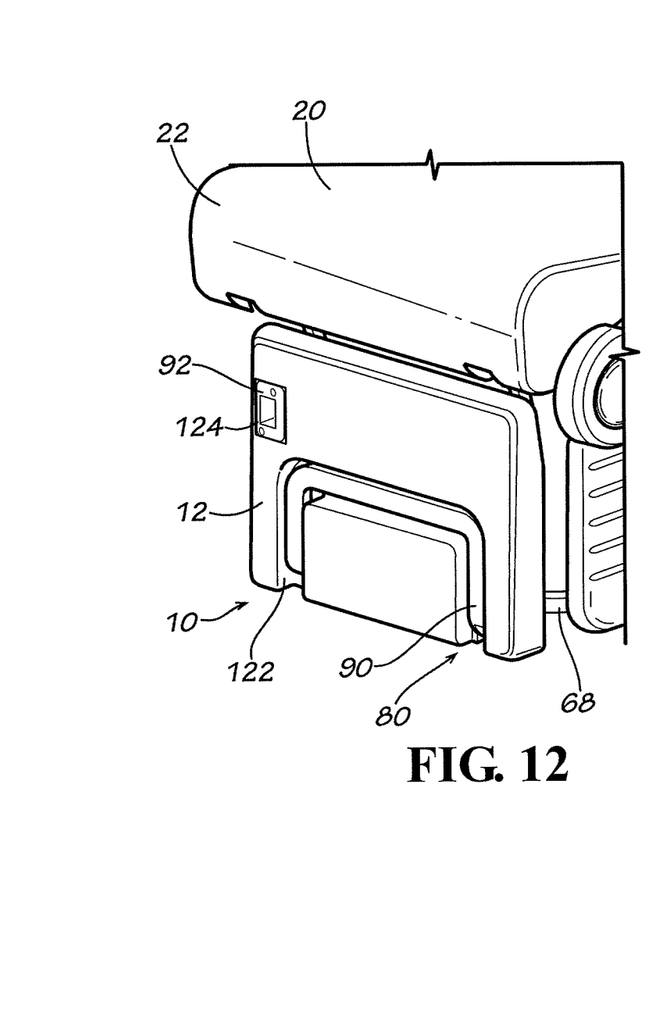
FIG. 12 is a front perspective view of a leg-rest assembly according to an alternative embodiment of the present invention.
Figure 13:
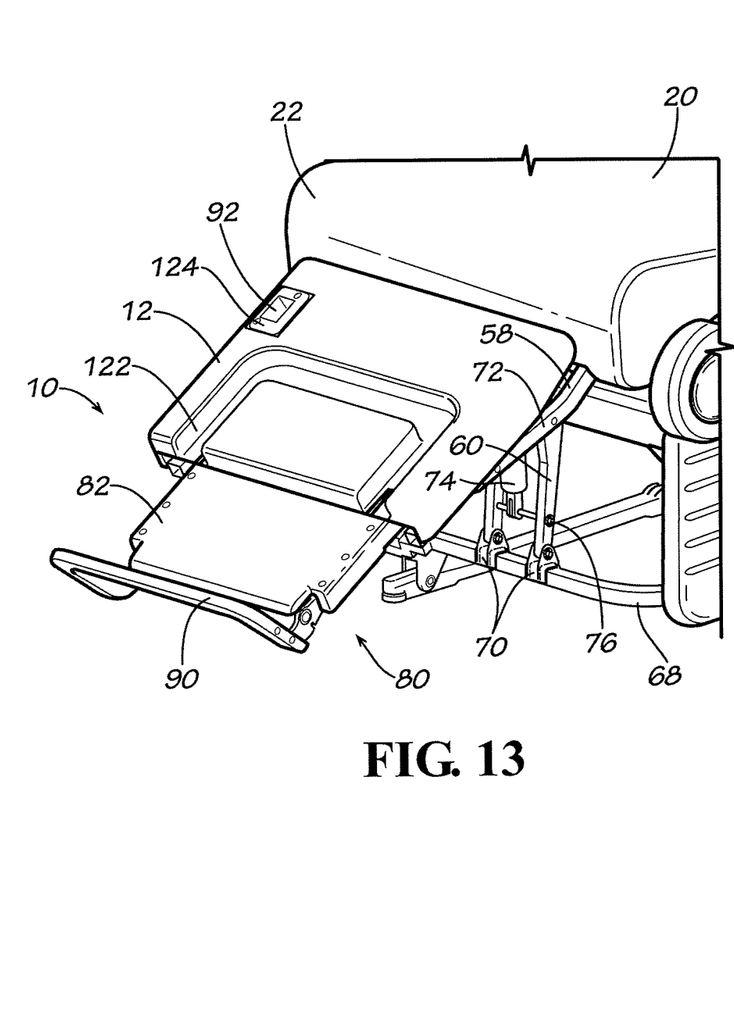
FIG. 13 is a front perspective view of the leg-rest assembly of FIG. 12 in a deployed position.
Figure 14:
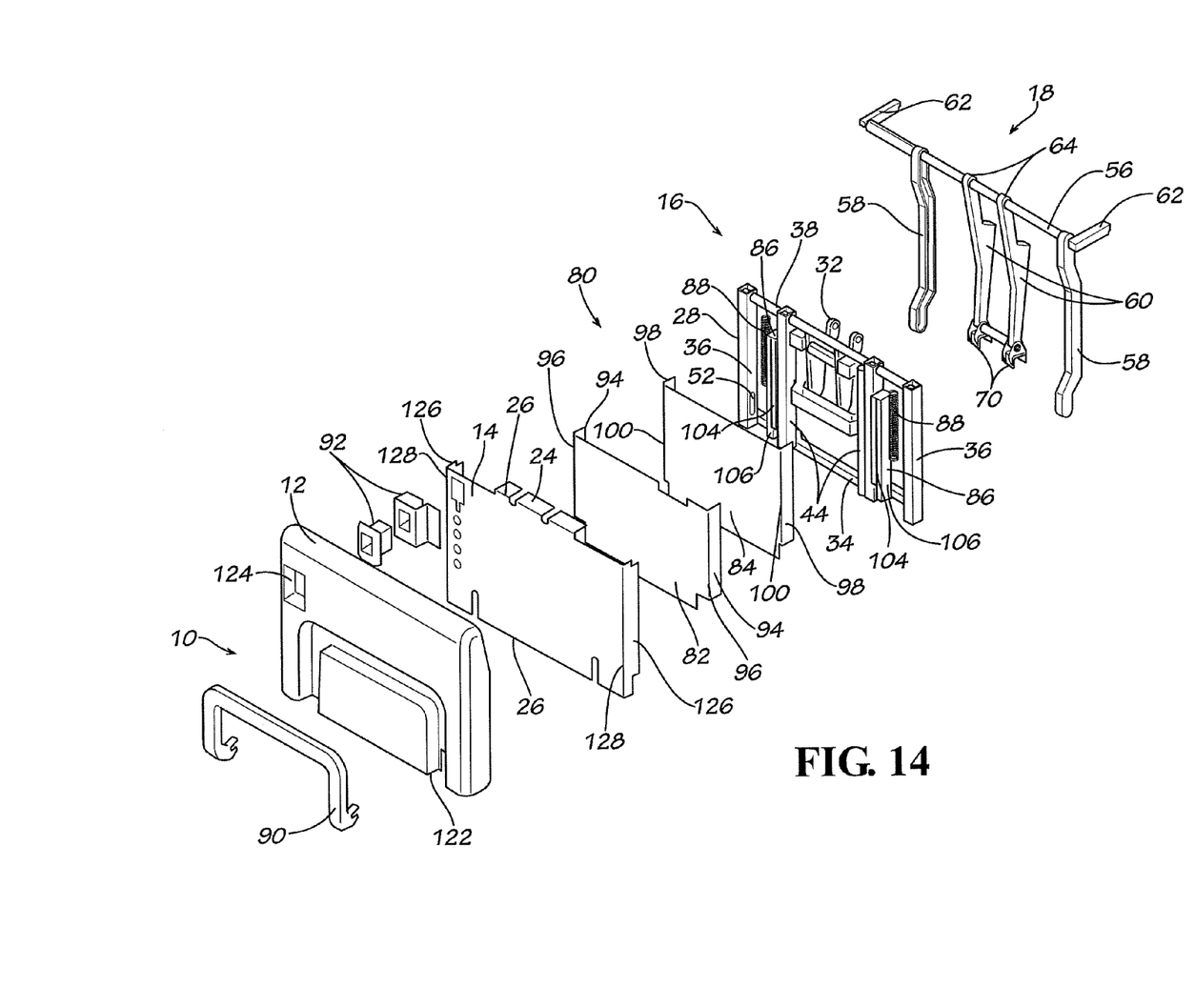
FIG. 14 is an exploded perspective view of the leg-rest assembly of FIG. 12.
Figure 15:
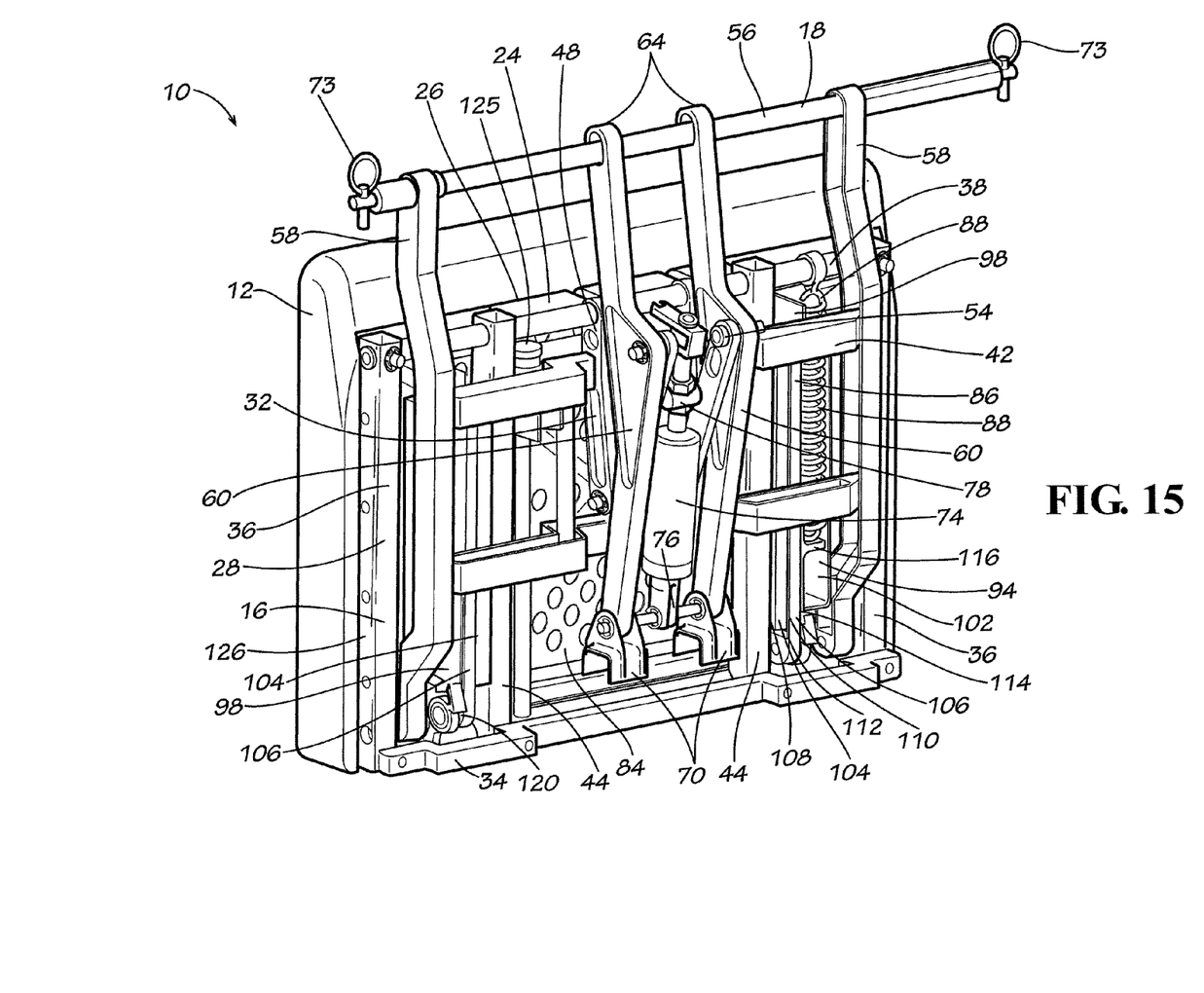
FIG. 15 is a rear perspective view of the leg-rest assembly of FIG. 12 in a stowed position.
Figure 16:
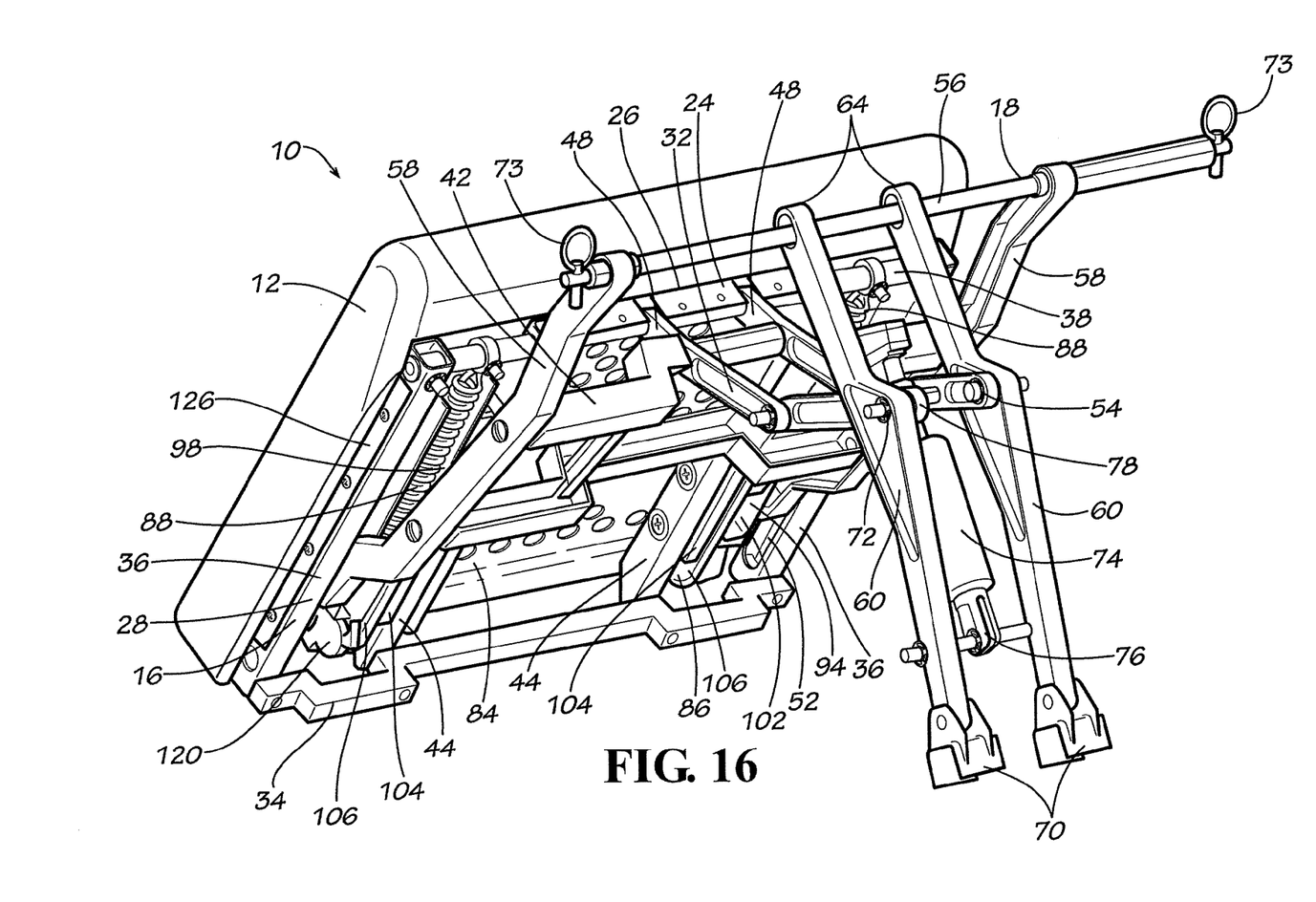
FIG. 16 is a rear perspective view of the leg-rest assembly of FIG. 12 in a deployed position.
Figure 17:
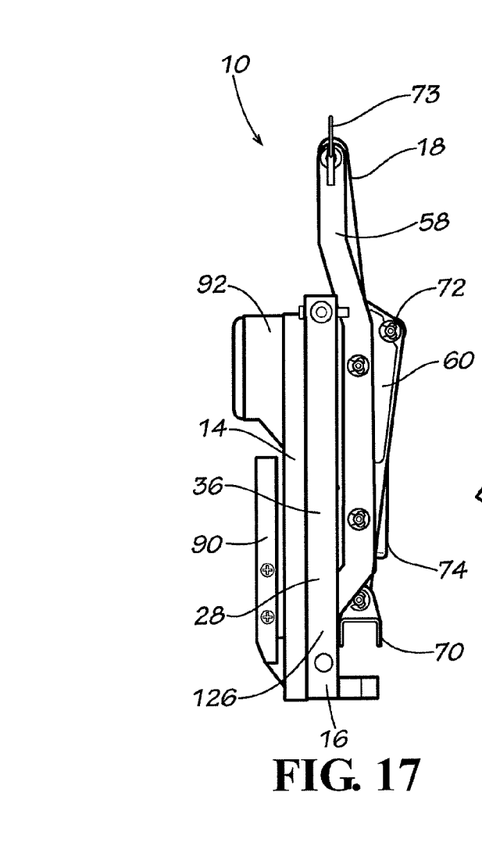
FIG. 17 is a side view of the leg-rest assembly of FIG. 12 in a stowed position.
Figure 18:
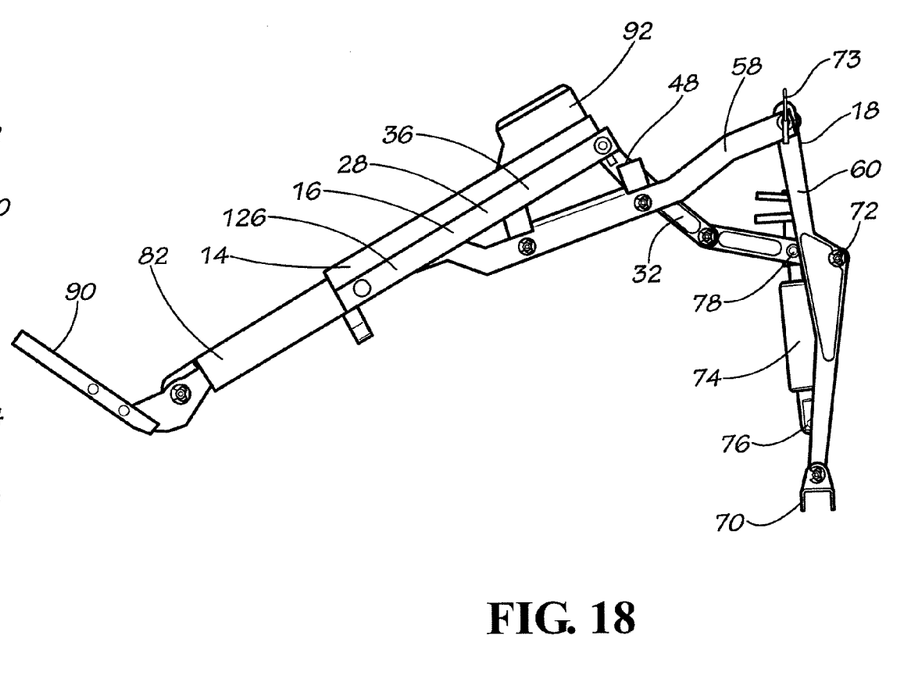
FIG. 18 is a side view of the leg-rest assembly of FIG. 12 in a deployed position.
Figure 19:
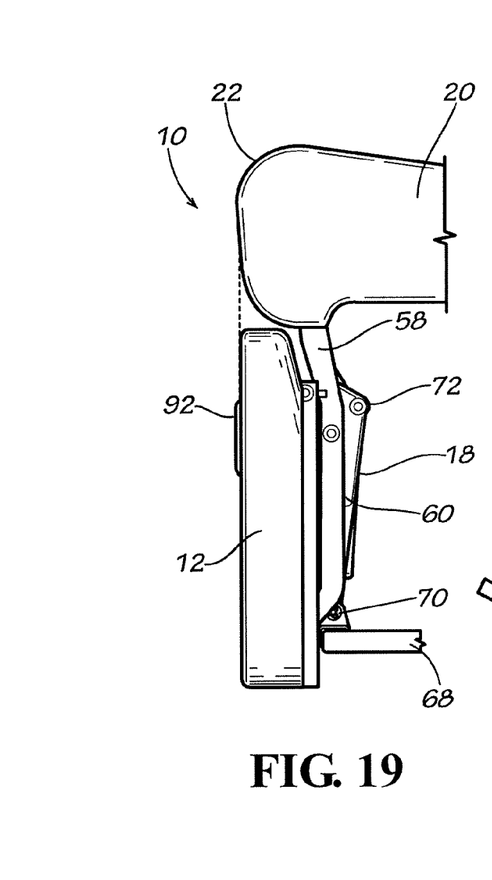
FIG. 19 is a side view of the leg-rest assembly of FIG. 12 in a stowed position in conjunction with a passenger seat.
Figure 20:
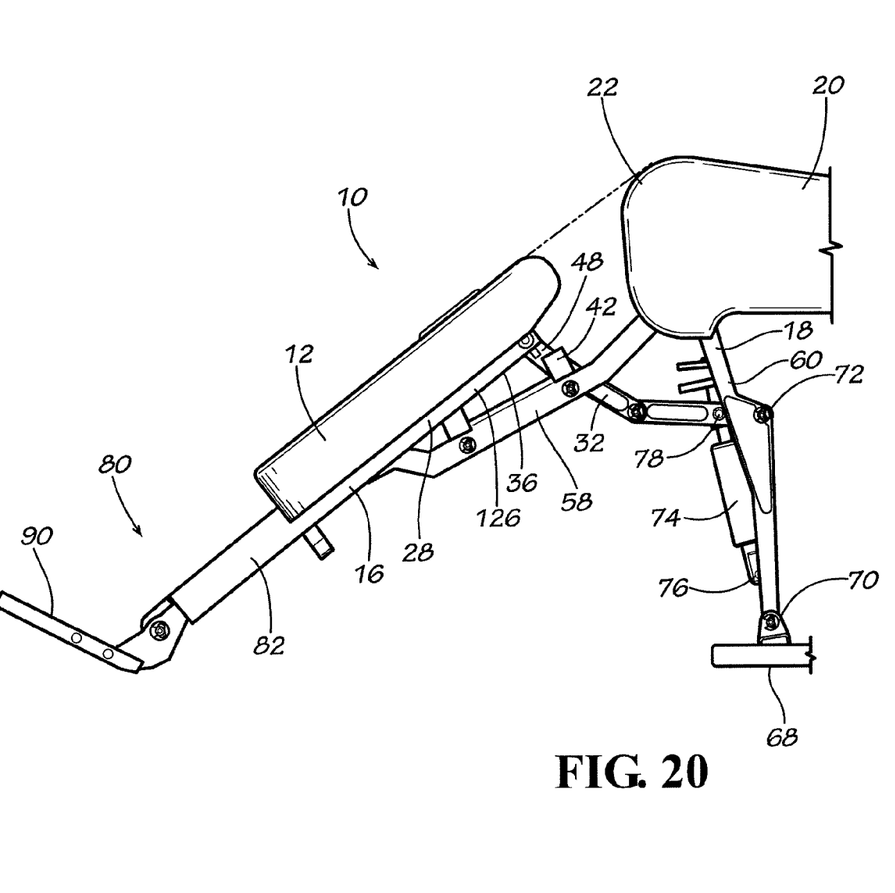
FIG. 20 is a side view of the leg-rest assembly of FIG. 12 in a deployed position in conjunction with a passenger seat.

As shown in FIGS. 12-14, the cushion 12 may also include an aperture 124 to allow placement of the mechanical control lever 92 to operate the foot-rest mechanism 80. The aperture 124 may have any appropriate shape that allows a passenger to access the mechanical control lever 92. The mechanical control lever 92 is then coupled to the leg-rest pan 14 via any suitable mechanical fastening device including but not limited to rivets, screws, or other similar devices.

To release the foot-rest mechanism 80, a passenger engages the mechanical control lever 92. The mechanical control lever 92 is coupled to a mechanical control 125, which is in turn coupled to the foot-rest pan 84 and releasably coupled to the frame 28. Engagement of the mechanical control lever 92 operates to disengage the mechanical control 125 from the frame 28. When the mechanical control 125 is disengaged from the frame 28, the sliding portions 106 are capable of moving relative to the stationary portions 104 of the foot-rest slides 86 so that the foot-rest mechanism 80 is free to slide. To extend the foot-rest mechanism 80 from a retracted position, the passenger places pressure on the foot-rest bar 90 to overcome the force of the springs 88 while continuing to engage the mechanical control lever 92. When the foot-rest mechanism 80 is at the desired extended position, the passenger releases the mechanical control lever 92, which in turn engages the mechanical control 125 to the frame 28 to restrain the movement of the sliding portions 106 relative to the stationary portions 104 of the foot-rest slides 86 so that the foot-rest mechanism 80 is no longer free to slide.

To retract the foot-rest mechanism 80, the passenger actuates the mechanical control lever 92, again disengaging the mechanical control 125 from the frame 28 to allow the sliding portions 106 to move relative to the stationary portions 104 of the foot-rest slides 86 so that the foot-rest mechanism 80 is free to slide. The springs 88 then operate to retract the foot-rest mechanism 80 into the retracted position. When the foot-rest mechanism 80 is fully retracted, the passenger releases the mechanical control lever 92, which in turn engages the mechanical control 125 to the frame 28 to restrain the movement of the sliding portions 106 relative to the stationary portions 104 of the foot-rest slides 86 so that the foot-rest mechanism 80 is no longer free to slide.

In other embodiments, a gas spring may perform both the mechanical and braking features of the foot-rest mechanism 80. In yet other embodiments, the foot-rest deployment and stowage may be controlled by an electrically operated deployment, where the passenger uses a display screen or electrical switch to deploy and stow the foot-rest mechanism 80.

The leg-rest pan 14 may include both flanges 24 and flanges 126, where flanges 24 are coupled to the leg-rest pan 14 along the upper and lower edges 26 and flanges 126 are coupled to the leg-rest pan 14 along side edges 128. The flanges 24 extend along the outer sides of the upper bar 38 and the lower pivot bar 34, and the flanges 126 extend along the outer sides of the side bars 36. The leg-rest pan 14 is then coupled to the first frame 28 via mechanical fastening devices such as rivets, screws, or other similar devices. In some embodiments, the flanges 24 have been shortened to accommodate attachment of the foot-rest mechanism 80 to the frame structure 16.

As shown in FIG. 14, in this embodiment, the frame structure 16 no longer requires the use of the second frame 30. Instead, the slides 52 are relocated to the bottom ends of the side bars 36. By relocating the sliding surface to the bottom of side bars 36, the slider bar 46 is eliminated, and the support bars 44 and the link extensions 48 are coupled directly to the upper bar 38. The pivot arms 58 of the mounting structure 18 are then coupled directly to the slides 52 in their modified location. The vertical support 60 is also coupled to the upper pivot bar 42. In some embodiments, the upper pivot bar 42 has a U-shaped configuration to provide for additional space for operation of the two foot-rest slides 86. However, one of skill in the art will understand that the upper pivot bar 42 may have any suitable shape.

By relocating the slides 52 to the bottom ends of the side bars 36, vertical support 60 moves to the upper end of the slides 52 during deployment, causing the leg-rest assembly 10 to travel away from the seat 20. The link extensions 48 still push the leg-rest pan 14 out so that the cushion 12 is tangentially aligned with the curve of the passenger seat bull nose 22, but a larger space is formed between the cushion 12 and the passenger seat bull nose 22. By changing the direction that the leg-rest assembly 10 travels during deployment, the amount of distance needed for the foot-rest mechanism 80 to travel is minimized. In some embodiments, the leg-rest assembly 10 travels at least 1 inch to provide added length for the foot-rest mechanism 80. In other embodiments, the leg-rest assembly 10 travels at least 2.5 inches to provide added length for the foot-rest mechanism 80. In yet other embodiments, the leg-rest assembly 10 may have no significant downward movement during deployment.

The foot-rest mechanism 80 may be deployed after the leg-rest assembly 10 has been deployed. A passenger first rotates the foot-rest bar 90 out of its recessed area 122 within the cushion 12. The passenger then actuates the mechanical control lever 92 that allows the passenger to extend the foot-rest mechanism 80 from its recessed position until the foot-rest bar 90 reaches a desired position.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A leg-rest assembly comprising:
   a. a leg-rest pan comprising an exterior surface and an interior surface;
   b. a first frame comprising at least two slides, wherein the leg-rest pan interior surface is coupled to the first frame;
   c. a slider bar, wherein the ends of the slider bar are coupled to the at least two slides;
   d. a second frame comprising an upper pivot bar, wherein the second frame is pivotally coupled to the first frame;
   e. at least one deployment link, wherein the at least one deployment link is pivotally coupled at one end to the upper pivot bar and pivotally coupled at an opposing end to a vertical support; and
   f. a gas spring, wherein a lower end of the gas spring is coupled to the vertical support and an upper end of the gas spring is coupled to the at least one deployment link.

2. The leg-rest assembly of claim 1, further comprising at least one link extension, wherein the at least one link extension is coupled at one end to the upper pivot bar and coupled at an opposing end to the slider bar.

3. The leg-rest assembly of claim 1, further comprising a coupling structure comprising a coupling pivot bar and at least two pivot arms, wherein each pivot arm is pivotally coupled at one end to the coupling pivot bar and coupled at an opposing end to the second frame.

4. The leg-rest assembly of claim 3, wherein the vertical support comprises a slot on one end of the vertical support, wherein the slot is configured to receive a cross-sectional shape of the coupling pivot bar.

5. The leg-rest assembly of claim 4, wherein an opposing end of the vertical support comprises a baggage bar mount.

6. The leg-rest assembly of claim 3, further comprising at least two seat diaphragm mounts, wherein the at least two seat diaphragm mounts are coupled at one end to the coupling pivot bar and coupled at an opposing end to a seat diaphragm.

7. The leg-rest assembly of claim 1, further comprising a cushion comprising an exterior surface and an interior surface, wherein the cushion interior surface is coupled to the leg-rest pan exterior surface, and wherein the cushion exterior surface does not extend past a vertical line tangential to a passenger seat bull nose when the leg-rest assembly is in a stowed position.

8. The leg-rest assembly of claim 1, further comprising a cushion with an exterior surface and an interior surface, wherein the cushion interior surface is coupled to the leg-rest pan exterior surface, and wherein the cushion exterior surface is tangentially aligned with a curve of a passenger seat bull nose when the leg-rest assembly is in a deployed position.

9. A method of deploying a leg-rest assembly, wherein the leg-rest assembly comprises (a) a leg-rest pan comprising an exterior surface and an interior surface, (b) a first frame comprising at least two slides, wherein the leg-rest pan interior surface is coupled to the first frame, (c) a slider bar, wherein the ends of the slider bar are coupled to the at least two slides, (d) a second frame comprising an upper pivot bar, wherein the second frame is pivotally coupled to the first frame, and (e) at least one deployment link, wherein the at least one deployment link is pivotally coupled at one end to the upper pivot bar and pivotally coupled at an opposing end to a vertical support, the method comprising the steps of:

a. providing a gas spring, wherein a lower end of the gas spring is coupled to the vertical support and an upper end of the gas spring is coupled to the at least one deployment link;
 b. actuating the gas spring;
 c. rotating the at least one deployment link to a deployed position;
 d. raising the second frame to a deployed position;
 e. positioning the slider bar adjacent lower ends of the slides; and
 f. raising the first frame to a deployed position.

10. The method of claim 9, further comprising the steps of:
 g. providing a coupling pivot bar;
 h. providing at least two pivot arms;
 i. coupling the coupling pivot bar to the at least two pivot arms; and
 j. coupling the at least two pivot arms to the second frame.

11. The method of claim 10, further comprising the steps of:
 k. providing at least two diaphragm mounts;
 l. providing a seat diaphragm;
 m. coupling the at least two diaphragm mounts to the coupling pivot bar; and
 n. coupling the at least two diaphragm mounts to the seat diaphragm.

12. The method of claim 9, further comprising the steps of:
 g. providing a cushion comprising an exterior surface and an interior surface;
 h. coupling the cushion interior surface to the leg-rest pan exterior surface;
 i. aligning the leg-rest assembly in a deployed position so that the cushion exterior surface is tangentially aligned with a curve of a passenger seat bull nose.

13. The method of claim 12, further comprising the steps of:
 j. actuating the gas spring;
 k. lowering the first frame to a stowed position;
 l. positioning the slider bar adjacent upper ends of the slides;
 m. lowering the second frame to a stowed position;
 n. rotating the at least one deployment link to a stowed position;
 o. aligning the leg-rest assembly in a stowed position so that the cushion exterior surface does not extend past a vertical line tangential to a passenger seat bull nose.

* * * * *